UNITED STATES PATENT OFFICE.

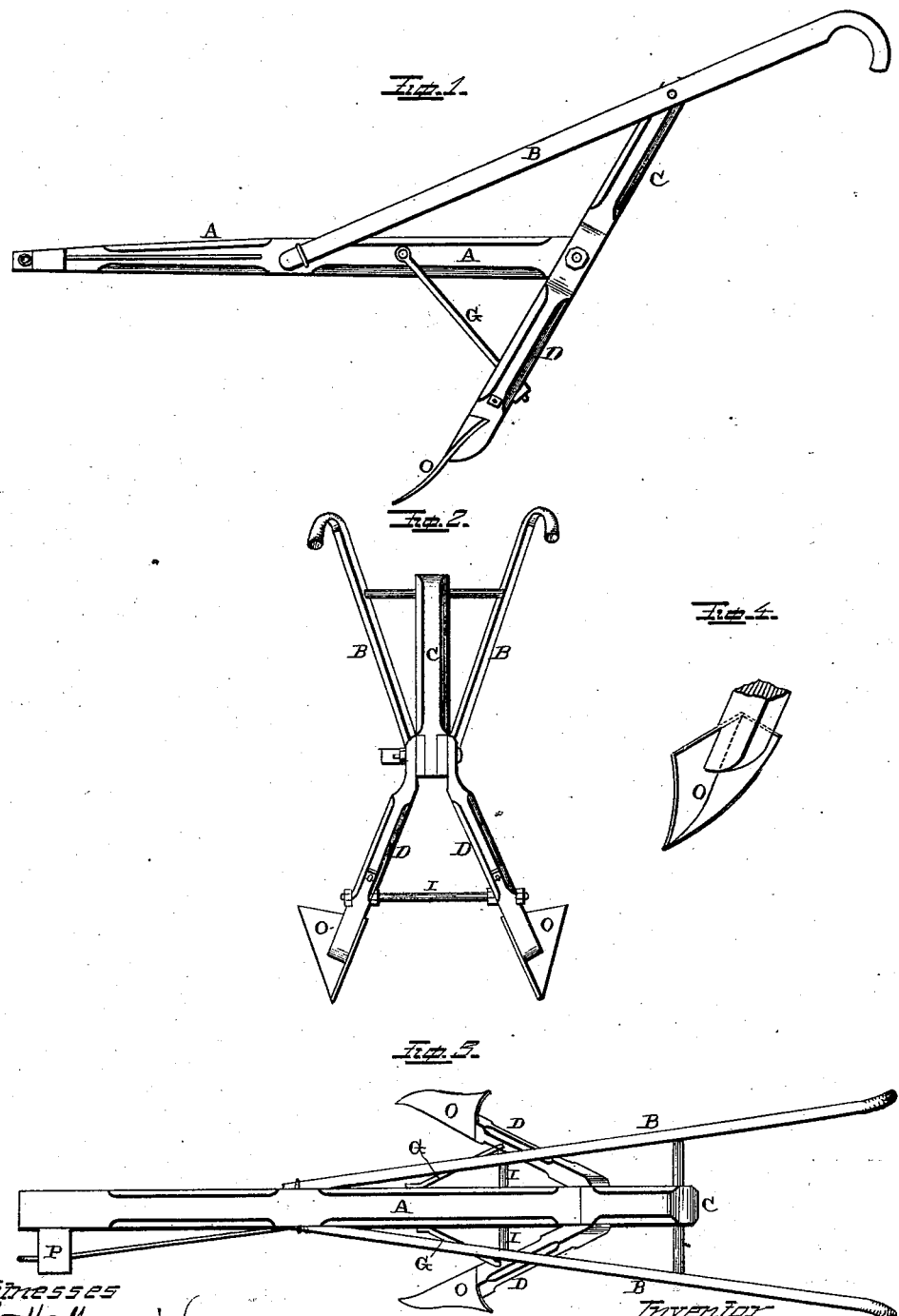

SMITH R. BELL, OF PALESTINE, ARKANSAS.

CULTIVATOR.

SPECIFICATION forming part of Letters Patent No. 235,986, dated December 28, 1880.

Application filed September 7, 1880. (No model.)

*To all whom it may concern:*

Be it known that I, SMITH R. BELL, of Palestine, in the county of St. Francis and State of Arkansas, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in corn and cotton plows and cultivators; and it consists in attaching both of the standards to the rear end of the plow-beam just opposite each other and inclining the lower ends of these standards outward in opposite directions, so that when the plow or cultivator is drawn along upon each side of the row the dirt will be pressed inward at the top of the furrow toward the young growing plants instead of being thrown toward them, as will be more fully described hereinafter.

Figure 1 is a side elevation of my invention. Fig. 2 is a rear view of the same. Fig. 3 is a plan view. Fig. 4 is a perspective of one of the plow-shovels.

A represents the beam; B, the handles; C, the support for the handles, and D the two plow-standards, which are braced in position by the braces G. These two standards are secured to the rear end of the beam just opposite each other, and are held in position by the same clamping-bolt. The inner sides of the upper ends of these standards are cut away, as shown, so that when the two standards are clamped in position their lower ends will be turned outward from each other, as shown in Fig. 2. In order to hold these two standards securely in this position, a brace, I, is passed through them, as shown, at any suitable distance above the top edges of the plow-shovels, so that these standards can neither be forced outward farther apart or nearer together, no matter with what obstruction they may meet. The shovels or plows O secured to these standards may be of any desired form, but have their inner edges turned backward around the inner sides of the plow-standards, as shown, and the extreme rear edges of these turned-back portions of the shovels are nearer together than the front edges, or the points at which they are bent.

As this plow or cultivator is drawn along upon each side of the row of growing plants, the points of the shovels being much farther apart than their upper edges, the earth is constantly forced inward toward the plants, instead of being thrown toward them, as is usually done by the plow and cultivators now in use. By pressing the earth inward toward the plants at the top of the furrow, instead of throwing it toward them, the plants are never injured by having clods or large amounts of earth thrown upon them, so as to crush them to the ground or otherwise injure them. Another advantage gained is that the furrow is left in a much better condition where the tops are simply pressed inward than where the earth is thrown inward by the shovels.

The draft-rod is secured to the side of the beam at a point just in advance of the front end of the handles, and passes through a block, P, which is secured to the side of the front end of the beam. By having this draft-rod secured to one side of the beam, as here shown, the draft-animal can pull the plow or cultivator along without any danger of its stepping upon the row of growing corn or cotton.

I am aware that it is not new to place the standards at an angle to each other, so that they diverge at their lower ends, where the standards are used in connection with a central standard, and this I disclaim.

Having thus described my invention, I claim—

In a cultivator, the combination of the beam A, angular standards D, and shovels O, the upper ends of the standards being cut away, so that the standards will diverge at their lower ends, and the shovels O being bent backward at their upper ends, whereby the dirt is pressed inward toward the plants, substantially as shown and described.

In testimony that I claim the foregoing I have hereunto set my hand this 30th day of August, 1880.

SMITH R. BELL.

Witnesses:
 PAUL M. COBB,
 ROBERT BROWN.